United States Patent [19]

Brown et al.

[11] Patent Number: 4,909,934
[45] Date of Patent: Mar. 20, 1990

[54] WATER PURIFICATION SYSTEM

[75] Inventors: Barry M. Brown, Baldwinsville; Evan A. Edwards, Pittsford; Frederick Tone, Holley, all of N.Y.

[73] Assignee: Eastman Kodak Company, Rochester, N.Y.

[21] Appl. No.: 195,560

[22] Filed: May 18, 1988

Related U.S. Application Data

[63] Continuation-in-part of Ser. No. 57,463, Jun. 3, 1987, abandoned.

[51] Int. Cl.$^4$ .................. B01D 13/00; B01D 21/34
[52] U.S. Cl. .................. 210/110; 210/134; 210/136; 210/137; 210/257.2; 210/321.65
[58] Field of Search ............ 210/257.2, 321.66, 409, 210/636, 110, 134, 136, 137, 321.65, 101, 103, 98, 195.2; 264/49

[56] References Cited

U.S. PATENT DOCUMENTS

| | | | |
|---|---|---|---|
| 3,794,172 | 2/1974 | Bray | 210/257.2 |
| 3,794,173 | 2/1974 | Bray | 210/257.2 |
| 4,176,063 | 11/1979 | Tyler | 210/257.2 |
| 4,585,554 | 4/1986 | Burrows | 210/257.2 |
| 4,595,497 | 6/1986 | Burrows | 210/257.2 |
| 4,626,346 | 12/1986 | Hall | 210/257.2 |
| 4,650,586 | 3/1987 | Ellis | 210/257.2 |
| 4,657,674 | 4/1987 | Burrows | 210/195.2 |
| 4,678,565 | 7/1987 | Norton | 210/257.2 |
| 4,743,366 | 5/1988 | Burrows | 210/195.2 |
| 4,775,465 | 10/1988 | Burrows | 210/257.2 |
| 4,776,952 | 10/1988 | Burrows | 210/257.2 |
| 4,808,302 | 2/1989 | Beall, Jr. | 210/257.2 |
| 4,830,744 | 5/1989 | Burrows | 210/257.2 |

Primary Examiner—Richard V. Fisher
Assistant Examiner—Joseph Drodge
Attorney, Agent, or Firm—John B. Turner

[57] ABSTRACT

"A water purification system has a reverse osmosis filtration unit which receives feed water from a feed water valve and separates it into product water and waste water. A reservoir has a movable separator dividing it into a product water chamber for receiving the product water and a control water chamber. The product water is delivered to an outlet connection from the product water chamber or directly from the filtration unit. A regulator is connected to the waste water outlet port of the filtration unit, the control water port of the reservoir, and a drain line. The regulator has a first valve for providing waste water from the filtration unit to the control water port of the reservoir for urging the separator toward the product water chamber. The regulator has a second valve that can rapidly drain water from the control water chamber of the reservoir and rapidly reduce pressure in the control water chamber, thus facilitating the refilling of the product water chamber. A relief valve downstream of the second valve maintains a low pressure in the system to avoid undesirable cycling of the system between high pressure and low pressure."

8 Claims, 2 Drawing Sheets

WATER PURIFICATION SYSTEM

CROSS REFERENCE TO RELATED APPLICATIONS

This application is a continuation-in-part to application Ser. No. 057463, entitled WATER PURIFICATION SYSTEM, filed June 3, 1987 now abandoned. This application also relates to Ser. No. 208,817, filed June 16, 1988, which is a continuation-in-part application of Ser. No. 057545, entitled REVERSE OSMOSIS APPARATUS, filed June 3, 1987 now abandoned.

BACKGROUND OF THE INVENTION

1. Field of the Invention

This invention relates to a system for producing purified water from feed water and for controlling its end use pressure.

2. Description of the Prior Art

Water purification systems have found increasing use in the home and the work place to raise the quality of tap water for drinking, cooking, ice making and the like. "Reverse osmosis processes" are a known class of processes in general use in these systems. These processes employ "reverse osmosis membranes" which are selectively impermeable to dissolved salts in aqueous solution. Some typical prior art purification systems include, in addition to the reverse osmosis membrane permeator, a pre-filter for initial screening of the feed water to prevent clogging and to protect the membrane, and a post-filter for further purification, especially for the removal of organics such as dissolved hydrocarbons. In general, in these systems, tap water or feed water is filtered and separated as product water and waste water.

Reverse osmosis membrane permeators constitute a major restriction to the flow of water through these purification systems, and so the filtration process is relatively slow. Therefore, a system of a size which is economically and aesthetically practical for the home is generally not able to generate product water on demand but must include a product water storage reservoir. Pressures within the system require control to optimize the system operation. Finally, waste water must be disposed of.

The prior art includes U.S. Pat. Nos. 4,021,343, 4,176,063, 4,391,712 and 4,695,375 to Tyler and 4,604,194 to Entingh. Tyler Pat. No. 4,021,343 describes an automatic purifier system including a reverse osmosis filter having an inlet for connection to a source of feed water, and a product water outlet leading to a reservoir having a pressure bladder. Waste water from the filter provides motive pressure on the opposite side of the bladder. A number of pilot and control valves are used to control the product and waster water flows.

Tyler Pat. No. 4,176,063 describes an improvement and simplification of the earlier Tyler Pat. No. 4,021,343. Among other things, it adds the capability of delivering water to an ice maker. In this later Tyler system, feed water flows through an inlet valve to a filtration unit. Product water flows from the filtration unit to a reservoir and to a pilot control for the inlet valve. Waste water flows from the filtration unit to a pressure control valve and from there to the pressure side of the bladder in the reservoir. The pressure control valve is controlled by pilot pressure of the product water.

Entingh Pat. No. 4,604,194 describes a water purification system including shut-off valve, regulating valve, reverse osmosis membrane, and bladder-pressurized reservoir. The regulating valve operates in response to product water pressure.

Additional prior art, relevant only to components of this system, includes U.S. Pat. Nos. 3,493,496 to Bray et al; 3,794,173 to Bray; and 3,789,993; 3,792,135; and 3,824,299 to Brown et al. Bray et al Pat. No. 3,493,496 discloses a water purification system having a bladder or diaphragm which is pressurized by water or air to provide motive pressure to the product water. Bray Pat. No. 3,794,173 discloses a water purification system with a hydraulically actuated valve, controlled by product water pressure, to raise motive pressure when water is withdrawn. Brown et al Pat. Nos. 3,789,993; 3,792,135; and 3,824,299 disclose the specifics of composition and manufacture of reverse osmosis membrane permeators which are used in this invention.

SUMMARY OF THE INVENTION

The water purification system of this invention includes a filtration unit of the reverse osmosis process type, which functions to separate feed water as product water and waste water, a reservoir having expandable and contractible product water and control water chambers, and a control valve subsystem.

The control valve subsystem includes a feed water shut-off valve and a regulating valve. The shut-off valve has a control chamber subjected to product water pressure to control its open-closed condition, and is effective to close at a predetermined upper limit of product water pressure. The regulating valve includes two diaphragm areas on a single moving element, two diaphragm-operated valves (only one of which can be open at one time), and a relief valve.

The regulating valve is responsive to a demand for bladder control water flowing to the reservoir acting on a smaller area of the diaphragm to establish a first, higher pressure of control water to pressurize the reservoir, and additionally, is responsive to an excess of bladder control water flowing from the reservoir acting on both the smaller area of the diaphragm and a larger area of the same diaphragm to establish a second, lower pressure of control water in the reservoir. The regulating valve thus automatically senses whether the system is requiring control water to be fed into the control water chamber to raise its pressure level; or is requiring control water to be relieved from the control water chamber to reduce its pressure level. The higher pressure of control water is desired as the motive pressure for delivery of product water at the faucet or ice maker; the lower back pressure of control water, during production and filling, enhances flow through the filtration unit.

DESCRIPTION OF THE PREFERRED EMBODIMENT

Figure 1:
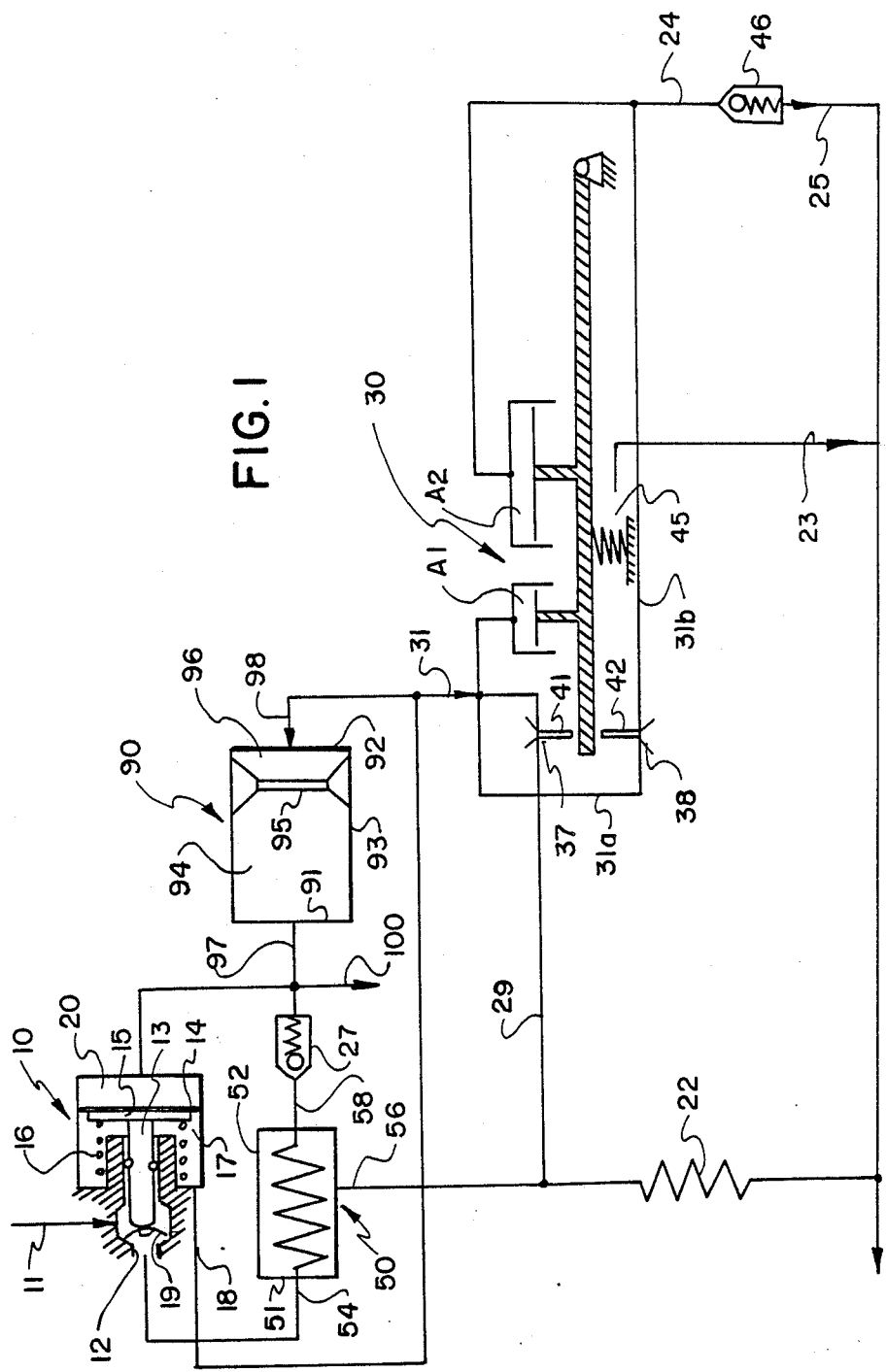
FIG. 1 is a schematic diagram of a water purification system, including control valving, a filtration unit, and a product water reservoir, according to this invention.

Referring now to FIG. 1, a water purification system is shown to include three major subsystems; a control valve subsystem, a filtration unit 50, and a product water reservoir 90.

The control valve subsystem controls the flow of feed water, product water, waste water, and "control water" through the system. Its primary components are an inlet or feed water shut-off valve 10 and a regulating valve 30.

Shut-off valve 10 includes an inlet port 11 for connection to a source of tap or feed water, an outlet port 12 leading to the filtration unit 50, and a valve stem 13 operatively connected to a diaphragm 14 and axially movable in the valve body for opening and closing the shut-off valve in response to product water pressure in a control chamber 20 above the diaphragm 14. Diaphragm 14 bears against a disk 15 fastened to the top of the valve stem 13. A compression spring 16 beneath the valve disk 15 urges the valve stem 13 toward its open position. The chamber 17 beneath the diaphragm 14 is a back pressure chamber and is connected to a back pressure line 18. The shut-off valve 10 includes a molded rubber valve disk 19 on the end of the valve stem 13. Feed water inflow in port 11 is around the periphery of the valve disk; the outflow is through axial outlet port 12 covered by the valve disk 19.

As product water pressure in valve control chamber 20 increases (once the reservoir is filled) the spring force holding valve 10 open is gradually overcome by the product water pressure in control chamber 20, and the valve stem moves in its closing direction until the valve disk 19 comes in sealing contact with the valve outlet port 12. When this happens, the outlet pressure is further reduced because of drainage and the valve disk 19 is thus more firmly pressed against its seat to effect an immediate and complete shut off. In this condition, even if the product water pressure slowly falls off because of faucet leakage, no shut-off valve leakage occurs until the shut-off valve stem pulls the valve disk away from its seat. There is some snap-action in this valve seating arrangement to preclude the valve being partially open for extended time periods wasting water to the drain.

Figure 2:
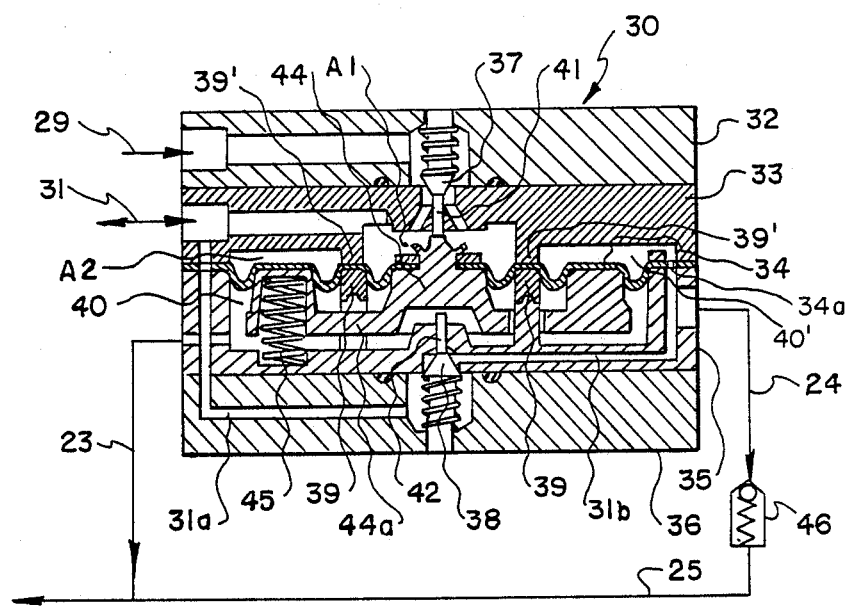
FIG. 2 is a sectional view of a regulating valve according to this invention.

In FIG. 1, regulating valve 30 is represented by a functional schematic diagram not resembling the structural geometry of the valve. The actual construction of regulating valve 30 is shown in FIG. 2. Regulating valve 30 is connected to a control water inlet port or line 29 communicating with the waste water outlet port 56 of the reverse osmosis filtration unit 50, a control water port or line 31 leading to the pressurizing control water chamber 96 in the product water reservoir 90, and to lines 23 and 24 leading to drain 25 (see also FIG. 2). Line 24 leads to relief valve 46 and then to drain and line 23 leads directly to the drain from the spring compression chamber 45. Regulating valve 30 senses the direction of flow of the pressurizing control water into and out of the reservoir control water chamber 96, and automatically adjusts this control water to a higher system pressure for product water delivery at faucet or ice maker, or to a lower system back pressure during production and reservoir filling, thereby increasing the rate of product water production and filling.

Referring now to FIG. 2 for structural details, regulating valve 30 includes a housing which in turn includes a top plate 32, an upper inner plate 33, a lower inner plate 35, and a bottom plate 36, all suitably fastened and sealed together. A diaphragm 34 having multiple convolutions is mounted between the inner plates 33 and 35 and across the cavity 40 formed by them. Diaphragm 34 bears on the top face of a piston 44 which is resiliently supported for axial movement within the valve cavity 40 on a plurality of compression springs 45 positioned around the interior of the valve cavity 40. Diaphragm 34 is clamped and sealed around its periphery between mating valve plates 33 and 35. Diaphragm 34 is also clamped and sealed between an upper annular seal ring 39' (which projects downward within valve plate 33) and a lower annular seal ring 39 (upstanding within valve plate 35). Seal rings 39 and 39' divide, the surface of the diaphragm 34 into two separate "working areas"; a central circular area A1 inside the seal rings 39, 39' and the surrounding annular area A2 radially outward of the seal rings 39, 39'. Piston 44 has several radial arms (one of which is shown at 44a) that project through openings in seal ring 39.

The interior valve cavity 40 beneath the diaphragm 34 is open to drain 25 through drain line 23, and is therefore always at atmospheric pressure. Control water inlet port 29 communicates with the central diaphragm area A1 through an upper poppet valve 37. Control water outlet port 31 communicates directly with the central circular area A1 of the diaphragm 34. Port 31 also communicates with annular area A2 of the diaphragm 34 by means of porting 31a, a lower poppet valve 38, porting 31b and one or more openings 34a in the diaphragm. The interior cavity 40' above the diaphragm 34 communicates with drain 25 through a spring-loaded relief valve 46 in drain line 24.

Poppet valve 37 includes a valve stem 41 directed toward the top of piston 44. Poppet valve 38 includes a valve stem 42 directed toward the bottom of piston 44. Poppet valves 37 and 38 are shown in their normal at-rest positions in which the upper poppet valve 37 is held open by springs 45 and piston 44 pushing on stem 41, and the lower poppet valve 38 is held closed by its own spring.

In order to correlate FIG. 1 with FIG. 2, it should be pointed out that: (a) the single diaphragm 34 in FIG. 2, having inner area A1 and surrounding annular area A2 is represented in FIG. 1 as separate, discrete diaphragms of areas A1 and A2 respectively; and (b) the piston 44 in FIG. 2 is represented in FIG. 1 as a long lever which is movable up and down against poppet valve stems 41 and 42 respectively, and urged upward by a single spring 45.

The reverse osmosis filtration unit 50 is shown only schematically. It includes a cylindrical outer housing pipe 52 which is integrally mounted on, and extends axially from, a mounting end plate 51 on one end. In an actual system of which an embodiment of this invention is part, mounting end plate 51 is the back plate of the associated control valve block to which the filtration unit 50 is mounted. Filtration unit 50 includes a feed water inlet port 54, a waste water outlet port 56, and a product water outlet port 58.

The product water reservoir 90 includes end plates 91 and 92 and a cylindrical pipe housing 93 extending between the end plates forming a watertight reservoir for purified product water and for pressurizing, control water. A faucet or other outlet connection 100 is provided for end use discharge of product water. A resilient movable separator 95 such as a bladder or movable piston is mounted within the reservoir cavity, dividing it into a product water chamber 94 and an expandable control water chamber 96. A product water port 97, which connects with product water line 58 from the filtration unit, leads into the product water chamber 94. A control water port 98, which connects with control water line 31 from the regulating valve 30, leads into the control water chamber 96.

Operation of the water purification system is more readily understood by reference to the functional schematic diagram of FIG. 1. However, the following description of the operation applies as well to the structure of FIG. 2.

The principal flow paths of water through this system are as follows: Feed water enters the system through shut-off valve 10 and flows into the filtration unit 50 which separates the feed water as product water and waste water. Product water flows from product water port 58 of the filtration unit, through check valve 27, to control chamber 20 of the shut-off valve, to product water chamber 94 of reservoir 90, and to outlet connection 100. Waste water flows from waste water port 56 of the filtration unit (a) through a flow restrictor 22 to drain 25 and (b) to the regulating valve 30 through line 29. The restrictor 29 constitutes restrictor means which allows flow of waste water to drain which is continuous when the valve 10 is open, and maintains a back pressure during such continuous flow.

When drawing off product water from the faucet or icemaker at connection 100, control water is supplied through inlet valve 37 by virtue of the diaphragm area A1 sensing the pressure in line 31. This pressure feeding the reservoir chamber 96 is maintained at about 15 psig by the force balance between pressure on the smaller diaphragm area A1 and the piston springs 45. When the draw off of product water is discontinued at faucet 100 and product water again begins to fill reservoir chamber 94, excess control water is forced out line 98 and 31 into the diaphragm control valve 30 where it presses against diaphragm area A1 and the control water pressure increases to maintain a force balance with the piston springs 45 which have been further compressed. When the control pressure reaches about 20 psig, the balance of forces is sufficient to open outlet valve 38 and a rapid downshift of pressure from about 20 psig to about 5 psig occurs because the control water chamber 96 is now in communication with the relief valve 46 and on the larger diaphragm area A2 while still acting on smaller area A2. Now the force balance is strongly in the down direction to move the outlet valve 38 to the full open position. Relief valve 46 in the drain line 24 from the diaphragm control valve maintains a high enough back pressure, about 5 psig, on diaphragm areas A1 and A2 to hold the outlet valve 38 open and to maintain sufficient pressure in the product water that it will flow at connection 100, on demand. Without this ball relief valve, as soon as the control valve pressure downshifts, it would very soon upshift again, then downshift again if the reservoir is still filling, resulting in an undesirable cycling condition. It will be observed that the pressure, 5 psig, maintained by the relief valve 46 is less than that, 20 psig, required on the first area of the diaphragm to cause opening of the second valve 42, and is above drain pressure.

It should be noted that the control water pressure from diaphragm regulating valve 30 is derived entirely from waste water and has no connection to the product (purified) water.

The diaphragm regulating valve feeds only enough control water to the pressurizing end of the reservoir 96 to displace product water from the other end 94 while drawing off product water at the desired pressure level (15 psig). It also releases control water from this same chamber 96 at a lower pressure level (5 psig) to minimize back pressure while filling, without sending any unnecessary water to the drain, thereby conserving water usage. Reverse osmosis water purification systems send waste water to the drain to flush away the salts on the upstream side of the membrane, and this flow is controlled by what is called a main restrictor. This is the only restrictor in the total system described above, whereas other known systems have a main restrictor and an additional control restrictor, both sending water to the drain.

It is to be understood that the terms "downward", "upward", "down", "downshift", "upshift" and the like used herein are not terms of limitation. Furthermore, the reverse osmosis filtration unit, reservoir and control valve subsystem may be oriented in any desired manner without affecting the operation of the members involved.

Although the preferred embodiment of the water purification system of this invention has been described, it will be understood that various changes may be made in form, detail, properties and arrangement of parts, the combination thereof and the mode of operations, which consist in a structure or method within the scope of the appended claims.

We claim:

1. In a water purification system comprising:
    a filtration unit for separating feed water into product water and waste water, the unit having (1) a feed water inlet port for receiving a supply of feed water, (2) a product water outlet port, and (3) a waste water outlet port;
    a drain line for conveying waste water from the waste water port to a drain;
    a reservoir having a movable separator dividing the reservoir into a product water chamber and a control water chamber, the reservoir having a product water port communicating with the product water chamber and a control water port communicating with the control water chamber;
    an outlet connection for end use discharge of product water; and
    means providing fluid communication between the product water outlet port of the filtration unit and the product water port of the reservoir and with the outlet connection so that product water from the unit can be provided to the product water chamber of the reservoir and thereby tend to increase pressure in the control water chamber or product water can be provided from the product water chamber of the reservoir to the outlet connection and thereby tend to decrease the pressure in the control water chamber; the improvement comprising:
    regulating means connected to (1) the waste water outlet port of the filtration unit, (2) the control water port of the reservoir and (3) the drain line, the regulating means having means responsive to pressure conditions in the control water chamber (1) for connecting the waste water outlet port of the filtration unit to the control water port in response to a decrease of the pressure in the control water chamber below a first pressure and (2) for connecting the control water port to the drain line in response to an increase in the pressure in the control water chamber above a second pressure higher than said first pressure.

2. In a water purification system comprising:

a filtration unit for separating feed water into product water and waste water, the unit having (1) a feed water inlet port for receiving a supply of feed water, (2) a product water outlet port, and (3) a waste water outlet port;

a feed water valve for controlling the flow of feed water to the inlet port of the filtration unit;

a drain line for conveying waste water from the waste water port to a drain;

restrictor means in said drain line adapted to allow flow of waste water to drain which is continuous when said feed water valve is open, and for maintaining a back pressure during continuous flow;

a reservoir having a movable separator dividing the reservoir into a product water chamber and a control water chamber, the reservoir having a product water port communicating with the product water chamber and a control water port communicating with the control water chamber;

an outlet connection for end use discharge of product water; and means providing fluid communication between the product water outlet port of the filtration unit and the product water port of the reservoir and the outlet connection so that product water can be provided to the reservoir and the outlet connection; the improvement comprising:

regulating means connected to (1) the waste water outlet port of the filtration unit, (2) the control water port of the reservoir and (3) the drain line, the regulating means comprising a first valve effective when open to provide waste water from the waste water outlet port of the filtration unit as control water to the control water port of the reservoir for urging the movable separator of the reservoid toward the product wateer chamber to facilitate removal of product water from the product water chamber to the outlet connection, and the regulating means comprising a second valve and back pressure maintaining means, said second valve being effective when opened to drain control water from the control water port of the resservoir through the back pressure maintaining means to the drain line and thereby effect a reduction in control water pressure in the control water chamber;

said regulating means further comprising valve actuating means for controlling the operation of said first and second valves, the actuating means comprising a diaphragm associated with said first and second valves, the diaphragm having first and second opposite sides and being responsive to fluid pressure conditions on opposite sides of the diaphragm for actuating said first and second valves in sequence, means for maintaining the second side of the diaphragm at substantially atmospheric pressure, the first side of the diaphragm having first and second working areas, the first working area of the first side of the diaphragm being in direct communication with the control water port of the reservoir, the second valve being adapted, when open, to provide communication between the second working area of the first side of the diaphragm and the control water port, means associating the diaphragm with said first and second valves so that the first valve is opened and waste water is provided to the control water chamber of the reservoir until pressure in such chamber increases to a level which acts through the first working area of the diaphragm to close the first valve, a subsequent increase in pressure at the outlet port caused by flow of product water into the product water chamber acting through the first working area of the diaphragm to cause the second valve to open and permit control water from the control chamber to flow through the second valve and the back pressure maintaining means to the drain line and reduce the pressure of the control water in the control water chamber to a pressure determined by said back pressure maintaining means, thereby facilitating separation of product water.

3. The invention as set forth in claim 2 wherein the means associating the diaphragm with the valves comprises a piston connected to the diaphragm, the piston being movable by the diaphragm in response to fluid pressure conditions on opposite sides of the diaphragm between (1) a first position wherein the piston opens the first regulating valve and (2) a second position wherein the piston opens the second regulating valve, and further comprising means associated with each of the regulating valves for urging the valves toward a closed position, and each of the regulating valves having means engageable by the piston as the piston moves between its positions to move the regulating valves to their respective open positions against the force of the urging means.

4. The invention as set forth in claim 3 further comprising a spring in the regulating means engageable with the piston for urging the piston toward its first position.

5. The invention as set forth in claim 2 wherein the first working area of the diaphragm comprises a circular center portion of the diaphragm and the second working area of the diaphragm comprises an annular portion radially outwardly from the first working area, the area of the annular portion being larger than the area of the circular portion, and the regulating means having seal means connected to the diaphragm between the two working areas to isolate the working areas from each other.

6. The invention as set forth in claim 2 wherein the regulating means has porting connecting the second valve to the second working area of the diaphragm so that when the second valve is opened water from the control water port of the reservoir is provided to the second working area to assist in holding the second valve open, and said back pressure maintaining means include a pressure relief valve located between the drain line and the porting so that when the second valve is open water can pass from the porting to the drain line through the relief valve with the relief valve maintaining a presure in the porting and against the second working area of the diaphragm, less than that required on said first area of said diaphragm to cause opening of said second valve.

7. The invention as set forth in claim 6 wherein the first working area of the diaphragm comprises a circular center portion of the diaphragm and the second working area of the diaphragm comprises an annular portion radially outwardly from the first working area, the area of the annular portion being larger than the area of the circular portion, and the regulating means having seal means connected to the diaphragm between the two working areas to isolate the working areas from each other.

8. In a water purification system comprising:
a filtration unit for separating feed water into product water and waste water, the unit having (1) a feed water inlet port for receiving a supply of feed water, (2) a product water outlet port, and (3) a waste water outlet port;

a drain line for conveying waste water from the waste water port to a drain;

restrictor means in said drain line;

a reservoir having a movable separator dividing the reservoir into a product water chamber and a control water chamber, the reservoir having a product water port communicating with the product water chamber and a control water port communicating with the control water chamber;

an outlet connection for end use discharge of product water; and means providing fluid communication between the product water outlet port of the filtration unit and the product water port of the reservoir and with the outlet connection; and a feed water valve having (1) an inlet port connectible to a supply of feed water (2) an outlet port in fluid communication with the feed water port of the filtration unit, and (3) a valve movable between first and second positions for opening and closing the valve to the flow of feed water between the inlet port and the outlet port of the valve, and the valve further comprising means associated with the valve stem for sensing the pressure of water in the product water chamber of the reservoir and for moving the stem between its first and second positions so that the stem closes the valve when the water pressure in the product water chamber reaches a predetermined pressure and opens the valve when such water pressure drops below a predetermined pressure;

said restrictor means being adapted to allow flow of waste water to drain which is continuous when said feed water valve is open and to maintain a back pressure during continuous flow;

the improvement comprising:

regulating means connected to (1) the waste water outlet port of the filtration unit, (2) the control water port of the reservoir and (3) thd drain line, the regulating means comprising a first normally-closed valve effective when opened to provide waste water from the waste water outlet port of the filtration unit to the control water port of the reservoir for urging the movable separator of the reservoir toward the product water chamber to facilitate removal of water from the product water chamber to the outlet connection, and the regulating means comprising a second normally-closed valve and back pressure maintaining means, said second valve being effective when opened to connect the control water port of the reservoir through the back pressure maintaining means to the drain line to reduce pressure in the control water chamber and facilitate separation of product water, said back pressure maintaining means being adapted to maintain a pressure above drain pressure in said control water chamber, and the regulating means further comprising valve actuating means for controlling the operation of the first and second valves so that when either one of such valves is opened the other one of such valves is closed, the actuating means comprising (1) a piston movable between two positions for selectively opening the first valve or the second valve and (2) a diaphragm connected to the piston, the diaphragm having first and second opposite sides and being responsive to fluid pressure conditions on opposite sides of the diaphragm for urging the piston toward one of its two positions, the second side of the diaphragm being in communication with the atmosphere, the first side of the diaphragm having first and second working areas, the first working area of the first side of the diaphragm being in direct communication with the control water port of the reservoir and the second working area of the first side of the diaphragm being in communication with such control water port only when the second valve is opened, and means for urging the piston toward its position for opening the first valve, whereby the urging means is effective to move the piston to its first position to open the first valve to provide waster water under pressure to the control water chamber of the reservoir until pressure in such chamber increases to a level which acts through the first working area of the diaphragm to close the first valve, a subsequent increase in pressure at the outlet port caused by flow of product water into the product water chamber acting through the first working area of the diaphragm to cause the second regulating valve to open and thus permit water from the control chamber to flow through the second valve and the back pressure maintaining means to the drain line, thereby facilitating separation of product water.

* * * * *